Patented May 24, 1932

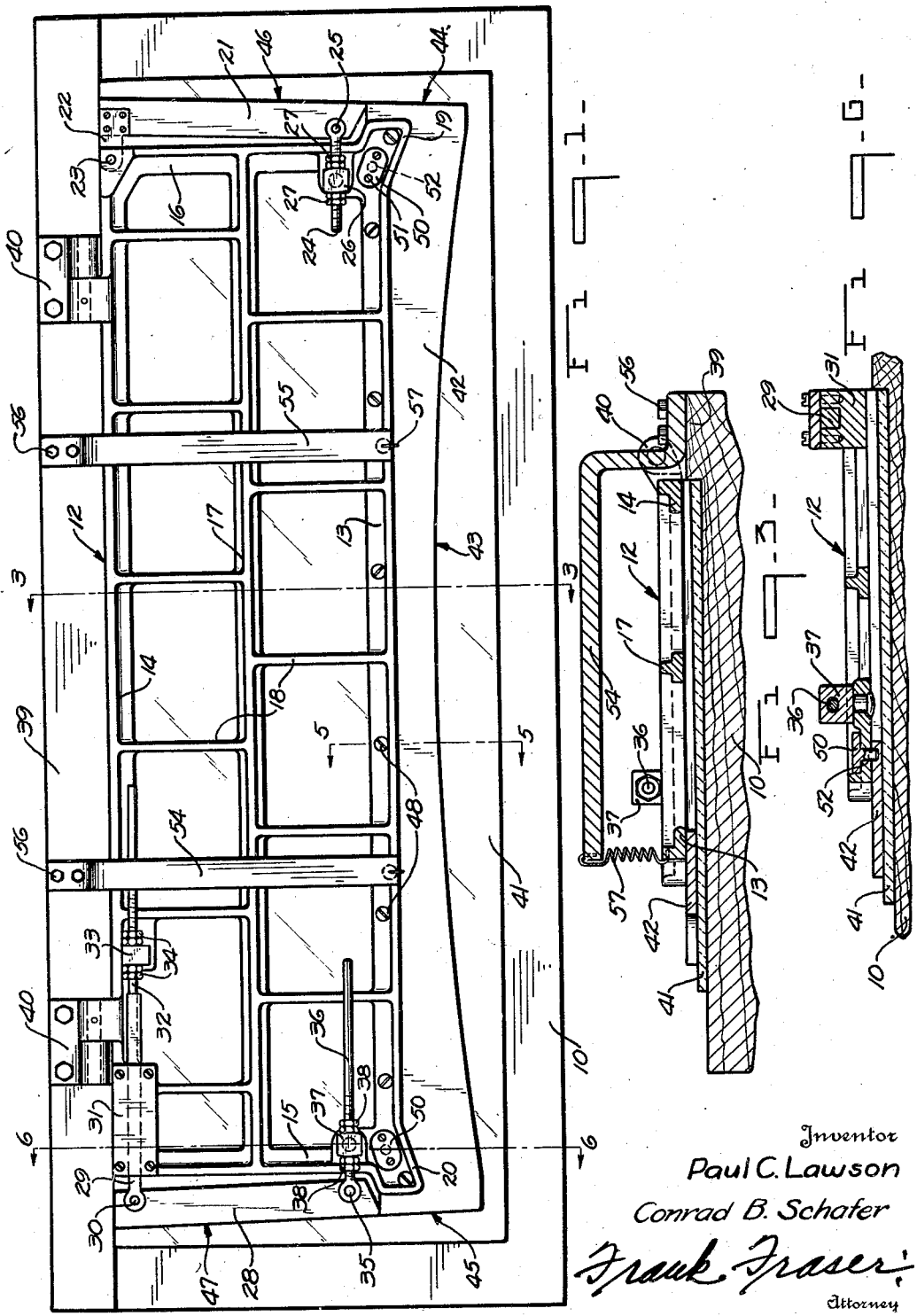

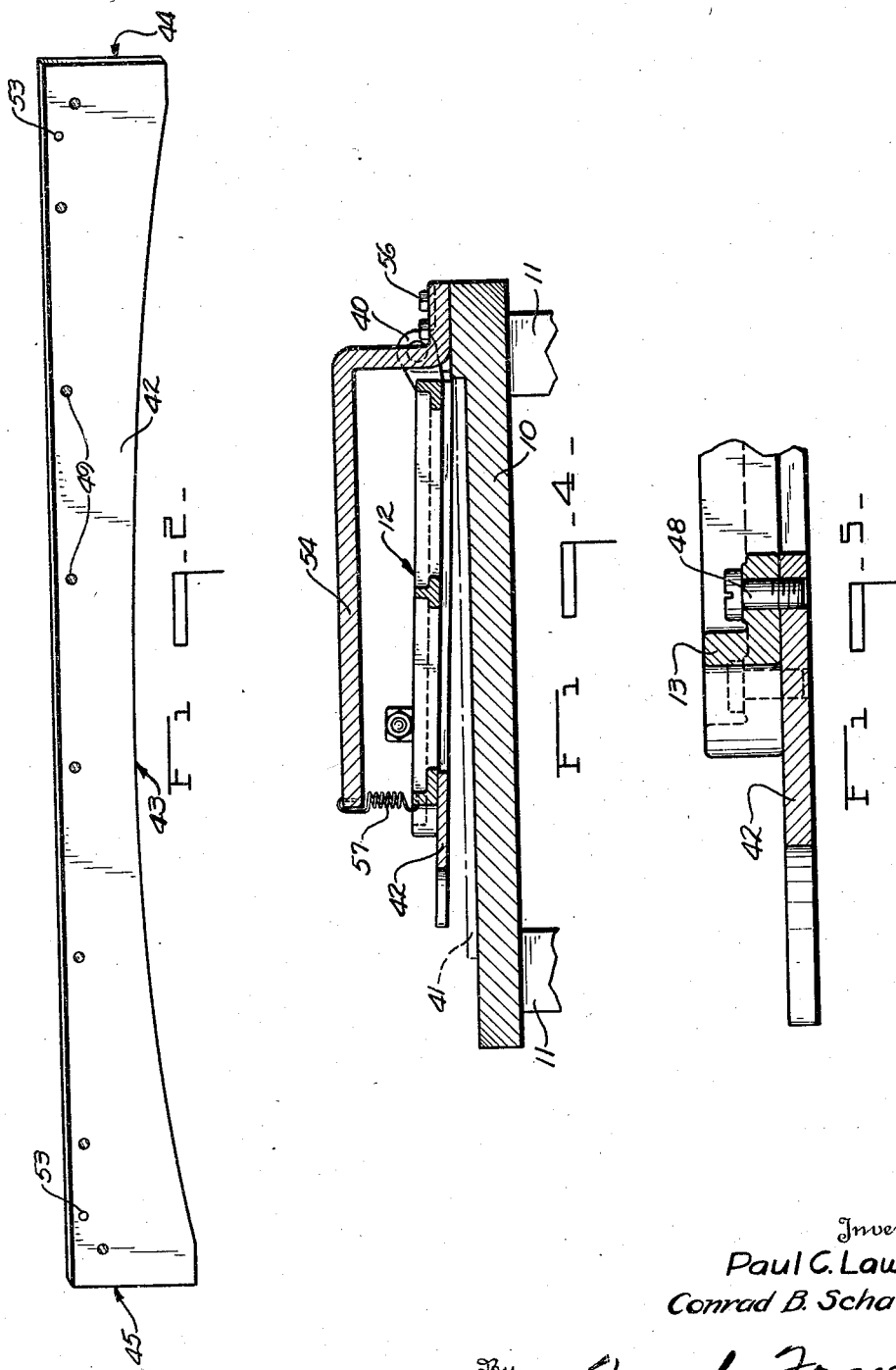

1,860,319

UNITED STATES PATENT OFFICE

PAUL C. LAWSON AND CONRAD B. SCHAFER, OF TOLEDO, OHIO, ASSIGNORS TO LIBBEY-OWENS-FORD GLASS COMPANY, OF TOLEDO, OHIO, A CORPORATION OF OHIO

ADJUSTABLE TEMPLATE

Application filed February 2, 1929. Serial No. 337,158.

The present invention relates broadly to glass cutting apparatus and more particularly to apparatus of this character primarily designed for use in the cutting of glass sheets into odd or irregular shapes such as, for example, automobile windshields.

An important object of the invention is the provision of glass cutting apparatus wherein is utilized a template or pattern adapted to rest upon or be disposed above the sheet to be cut, a cutting tool being drawn along the edges of the template or pattern to cut or score the sheet along the desired lines.

Another object of the invention is the provision of an improved template or pattern adjustable in a manner whereby to effect the cutting of windshields of various shapes and sizes and thereby tend to facilitate, simplify and otherwise improve generally the cutting operation.

Another object of the invention resides in the provision of such a template or pattern of the above character so constructed that the shape and size thereof may be readily and conveniently varied dependent upon the shape and size of windshield desired and further wherein the desired adjustments may be effected in a practical and convenient manner.

A further object of the invention involves the provision of a template or pattern including a frame carrying adjustable end members and a removable plate, said plate cooperating with the end members to form the outline of a windshield of the desired size and configuration.

Other objects and advantages of the invention will become more apparent during the course of the following description when taken in connection with the accompanying drawings.

In the drawings forming a part of this application and wherein like numerals are employed to designate like parts throughout the same, Fig. 1 is a plan view of glass cutting apparatus provided by the present invention, Fig. 2 is a view of the removable pattern plate, Fig. 3 is a transverse section taken substantially on line 3—3 of Fig. 1, showing the template in lowered position upon the glass sheet to be cut, Fig. 4 is a similar view showing the template slightly raised to permit the positioning of the sheet to be cut therebeneath, Fig. 5 is a detail section taken substantially on line 5—5 of Fig. 1, and Fig. 6 is a transverse section taken substantially on line 6—6 of Fig. 1.

Referring to the drawings, the apparatus herein provided includes a table for supporting the glass sheet to be cut comprising a substantially horizontal solid top 10 supported at either end upon legs 11, or in any other desired manner, and suitably braced to provide a rigid structure or support for the glass sheet and template.

Carried upon the top of the table is the template frame designated in its entirety by the numeral 12, said frame being substantially rectangular and comprising the longitudinally extending front and rear members 13 and 14 respectively connected by the transverse end pieces 15 and 16. The frame may be suitably braced and strengthened by the longitudinally extending intermediate member 17 connecting the end pieces and by the transverse members 18. The frame is of open work or cut-out formation for the sake of lightness, cheapness, etc. Formed at the opposite forward corners of the template frame 12 are the outwardly and diagonally projecting corner portions 19 and 20.

The template frame 12 is provided at one end, and preferably the right-hand end thereof, with an end member 21 having secured at its rear end a bracket plate 22 pivoted to the frame as at 23. Carried by the member 21 adjacent the forward end thereof is an adjusting bolt 24 pivotally secured thereto as at 25 and passing loosely through the bearing portion 26 carried by frame 12. Upon movement of the adjusting bolt 24 in the proper direction through the bearing portion 26, the end member 21 can be swung inwardly or outwardly as desired about its pivot point 23 to vary the position thereof. The adjusting bolt 24 may be secured in position after the end piece has been properly adjusted by nuts 27—27 disposed at opposite sides of bearing portion 26.

Arranged at the opposite end of template frame 12 is an end member 28 substantially similar in shape and size to the end member 21. This end member carries, adjacent its rear end, the adjusting bolt 29 pivotally secured thereto as at 30 and passing loosely through the elongated bearing block 31 carried by frame 12. That portion of the adjusting bolt 29 received within the bearing block is square or angular in cross section as shown in Figs. 1 and 6, while its rear end portion is rounded as at 32 and passed loosely through the bearing portion 33. The bolt 29 may be secured in proper position by means of the nuts 34—34 carried thereby at opposite sides of bearing portion 33.

Pivotally secured to the member 28, adjacent its forward end as indicated at 35, is an adjusting bolt 36 passing loosely through the bearing portion 37 carried by frame 12. The adjusting bolt 36 may be secured in proper position by nuts 38—38. From the construction illustrated and described, it will be apparent that the end member 28 can be swung inwardly or outwardly about its pivot point 30 upon movement of the adjusting bolt 36 in the proper direction through bearing portion 37. Likewise, the angle of the end member can be varied by swinging the same about its pivot point 35 upon sliding movement of bolt 29. Also, the end member can be moved inwardly and outwardly bodily to vary the length of the frame upon sliding movement of both adjusting bolts 29 and 36. Thus, upon proper adjustment of the end members 21 and 28, the length and shape of the template frame can be varied at will.

The top 10 of the table is provided along the rear longitudinal edge thereof with an upstanding ledge 39 and the template frame 12 is preferably hinged to this ledge by hinges 40—40. The frame is secured to this ledge so that when the glass sheet to be cut and herein designated 41, is laid upon the top 10 of the table, the template will lie flat thereupon as indicated in Fig. 3.

Carried by the frame 12 at the forward end thereof is the removable template or pattern plate 42 which is adapted to cooperate with the end members 21 and 28 to form the outline of a windshield of the desired size and configuration. The plate 42 is ordinarily formed with a curved front edge 43 and the rearwardly diverging end edges 44 and 45. The end members 21 and 28 are adapted to be adjusted so that the outer edges 46 and 47 respectively thereof will be in alignment or substantially coincident with the end edges 44 and 45 of plate 42. This plate is secured upon the underside of frame 12 by means of a plurality of screws or other securing elements 48 which pass through the member 13 and are received within openings 49 therein.

For the purpose of facilitating the positioning of the template 42 with respect to the template frame 12 so as to bring the openings 49 in proper position to receive the securing elements 48, there may be carried by each of the projecting corner portions 19 and 20 a plate 50 secured thereto by means of screws or the like 51 and having a pin 52 projecting downwardly through and beyond member 13 as shown particularly in Fig. 6. These pins may be termed the centering pins and are received within openings or recesses 53 in the template plate. Thus, when it is desired to secure the plate in position, it is first fitted upon the centering pins so that the openings 49 will be brought into proper position to receive the securing elements 48 therein.

The cutting of automobile windshields presents quite a problem for the reason that practically all different makes of automobiles are provided with windshields of different shapes and sizes, this difference in shape and size being, it may be true, in some instances, quite small, but nevertheless the difference is an important one since the windshields must be cut exactly to the proper shape and size. Heretofore, it has been proposed that a separate template, constructed of aluminum, be provided to take care of each different size and shape of windshield. However, this would require having on hand a large number of templates, and since it has been found that these templates are quite expensive, it would necessitate the expenditure of a considerable amount of money, some of which would be tied up in templates not very often used. On the other hand, the manufacturer must, however, be prepared to fill an order for any shape and size of windshield, and the aim of the present invention therefore is to provide a template adjustable so as to take care of a large number of different shapes and sizes of windshields.

According to the present invention, when it is desired to cut windshields of a uniformly predetermined shape and size, a plate 42 having the desired length, width and contour, is first secured to the template frame 12 in the manner above described, after which the end members 21 and 28 are adjusted to correspond thereto, or, in other words, so that their outer edges 46 and 47 respectively are arranged at the same angle as or coincide with the end edges 44 and 45 of pattern plate 42. When this has been done, the outer edges of the end members and pattern plate will define the size and shape of windshield to be cut. The template is then raised and the glass sheet to be cut placed upon the table 10 so that the rear longitudinal edge thereof is butted up against the ledge 39. The template is then pushed downwardly to rest flat upon the sheet and the cutting or scoring tool drawn along the edges 43, 44, 45, 46 and 47 to cut or score the sheet along the desired lines. The glass is then broken along these scored lines to produce the windshield of the desired shape and size and which windshield will be provided with forwardly diverging end edges and an inwardly bowed front edge.

When it is desired to produce windshields of a different shape and size, the plate 42 previously used is first removed and another plate of the desired shape and size secured in place, after which the end members are adjusted to correspond thereto. Thus, by changing the pattern plate 42 and adjusting the end members 21 and 28, it is possible to vary the length, width and configuration of the template to correspond with the shape and size of windshield desired.

It is desired that some means be provided for automatically raising the template a slight distance from the table upon the release thereof by the operator and for maintaining it in such position during the placing of another sheet to be cut upon the table. To accomplish this, the substantially horizontal arms 54 and 55 may be provided, said arms being arranged in spaced relation above the table and secured at their rear ends to the ledge 39 as indicated at 56. Secured to the forward ends of the arms 54 and 55 are springs 57 having their lower ends secured to the template frame 12. Since the arms are stationary, the template will be pulled upwardly by the springs upon the release thereof by the operator and will be maintained in such position until again forced downwardly.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In cutting apparatus of the character described, a table for supporting the sheet to be cut, a template associated therewith, end members pivotally carried thereby, and a pattern plate removably secured at the front of the template, the end edges thereof being adapted to coincide with the outer edges of the end members.

2. In cutting apparatus of the character described, a table for supporting the sheet to be cut, a template associated therewith and having end members pivotally connected thereto at each end, one of said members being movable bodily to increase or decrease the length of the template, and a pattern plate removably secured at the front of said template, the end edges thereof being adapted to coincide with the outer edges of the end members whereby to form the outline of a windshield of the desired shape and size to be cut.

3. In cutting apparatus of the character described, a table for supporting the sheet to be cut, a template associated therewith and having adjustable end members and a removable pattern plate, means for securing the plate to the template, and means for initially positioning the plate to receive the securing means.

4. In cutting apparatus of the character described, a table for supporting the sheet to be cut, a template frame associated therewith and being of substantially rectangular formation, and end members pivotally carried at the opposite ends of said template frame outwardly thereof, said end members carrying the cutter guiding edges for the end cuts.

5. In cutting apparatus of the character described, a table for supporting the sheet to be cut, a template frame associated therewith and being of substantially rectangular formation, end members pivotally carried at the opposite ends of said template frame outwardly thereof and adapted to be swung so as to assume different angular positions with respect thereto, and means for mounting one of said end members so that it is movable bodily relative to the template frame, said end members carrying the cutter guiding edges for the end cuts.

6. In cutting apparatus of the character described, a table for supporting the sheet to be cut, a substantially rectangular template frame associated therewith, a pattern plate removably carried at the front end thereof and projecting forwardly therebeyond and also beyond the opposite ends of the frame, and end members pivotally carried at opposite ends of the template frame outwardly thereof, the end edges of the pattern plate being adapted to coincide with the outer edges of the end members.

Signed at Toledo, in the county of Lucas, and State of Ohio, this 29th day of January, 1929.

PAUL C. LAWSON.
CONRAD B. SCHAFER.